April 23, 1940. J. O. CHERTKOF 2,198,450
LIGHT TRANSMITTING STRUCTURE
Filed Aug. 30, 1939 3 Sheets-Sheet 3
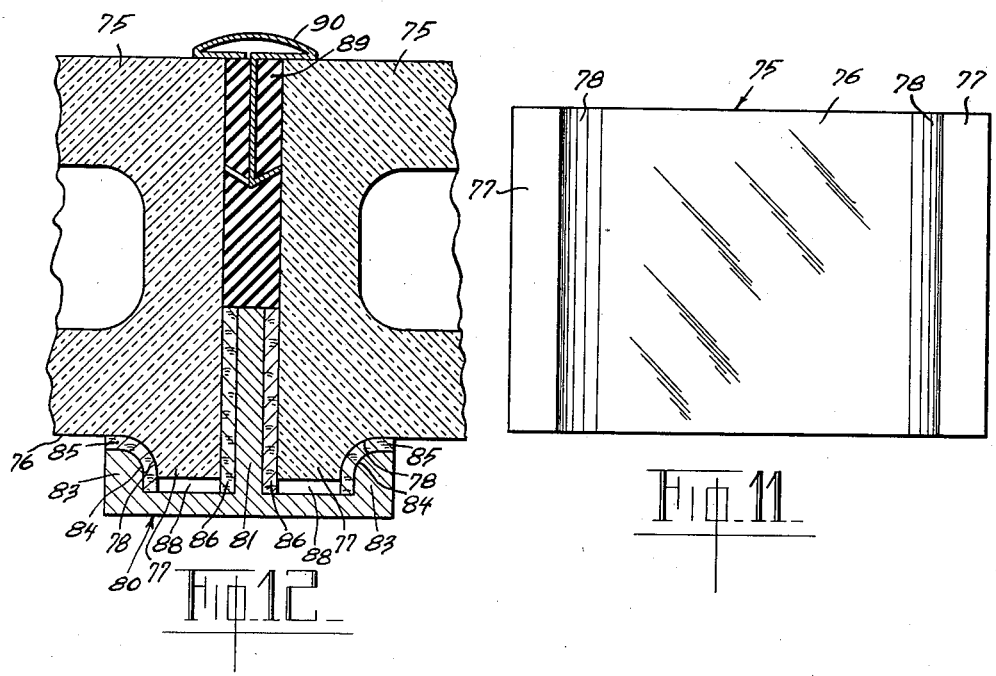
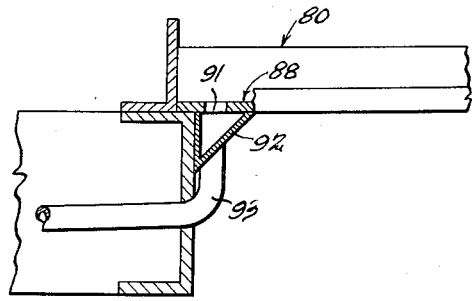
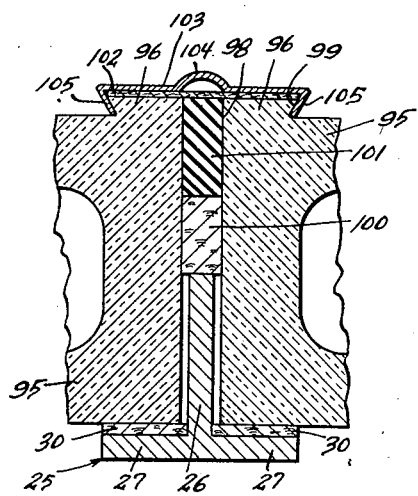
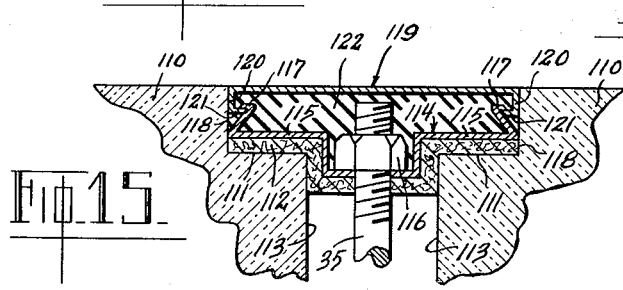
Inventor
Jack O. Chertkof

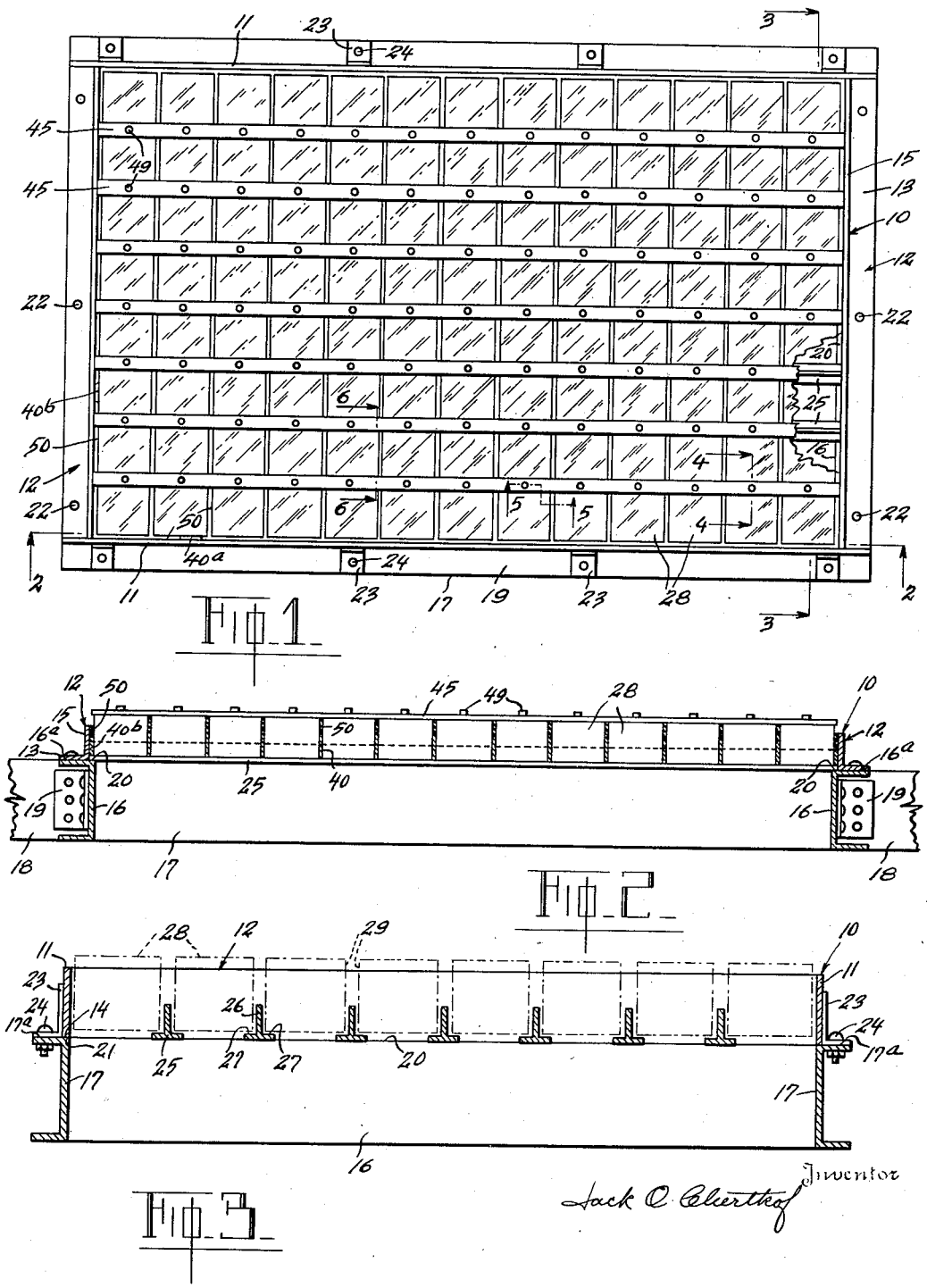

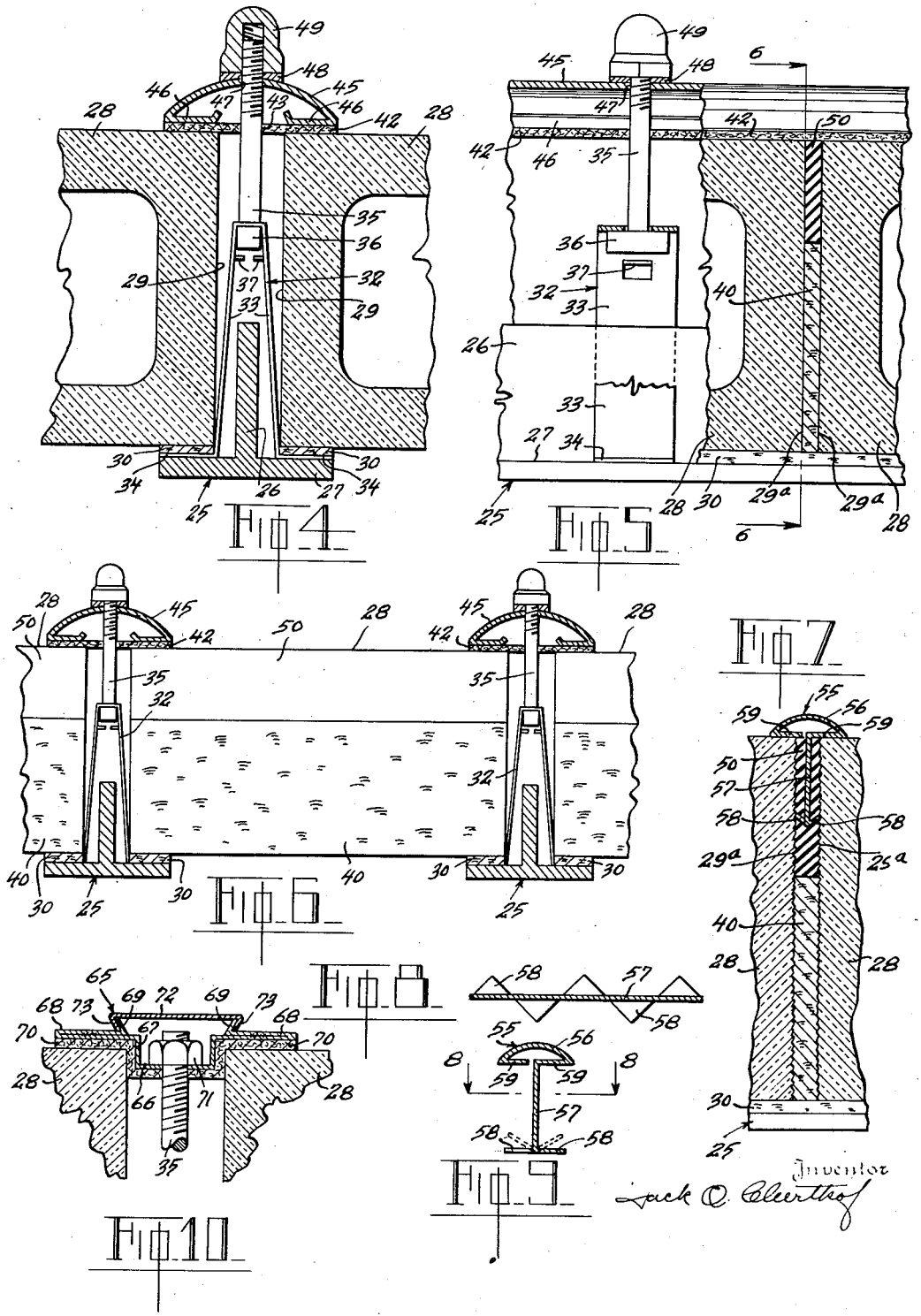

UNITED STATES PATENT OFFICE 2,198,450

LIGHT TRANSMITTING STRUCTURE

Jack O. Chertkof, Baltimore, Md.

Application August 30, 1939, Serial No. 292,721

22 Claims. (Cl. 108—16)

This invention relates to skylights and more particularly to a skylight structure utilizing glass blocks.

Glass blocks of the character utilized in building wall construction are particularly suitable for use in a skylight, vault light or floor light structure because of their inherent strength, insulating and light diffusing properties as well as the fact that by virtue of their hollow vacuum sealed construction such glass blocks will obviate the forming of any condensation on the inside surface thereof. As is well known skylights made up of ordinary window glass require a trough construction which only carries off a portion of the moisture condensed on the inside surface of the glass panes, the remaining portion dripping off of such surface with a resultant damaging effect on whatever might be below such skylight.

However, attempts heretofore made to build skylight structures using glass building blocks have not proved satisfactory. In such skylight structures the supporting frames for the glass blocks were made either of concrete, concrete and steel, or fabricated steel members, so designed that each glass block was seated in an individual frame unit and sealed therein by the use of various forms of sealing compounds, metallic or plastic. By virtue of the weight of such a skylight structure and the effect of expansion and contraction on the frame, glass blocks and sealing joints, there resulted a warping of the frame, cracking of the glass blocks and fracture of the sealing joints, thus rendering the skylight unsatisfactory because of water leakage therethrough, if not structurally unsafe. In addition to these disadvantages such skylight structures were expensive and difficult to manufacture. The replacement of glass blocks and the repair of sealing joints required skilled mechanics and the expenditure of a great amount of time, as in most instances there existed no provision for the ready removal of the glass blocks from the skylight frame. Furthermore the great amount of the available space taken up by the supporting frame reduced the amount of light transmission as well as causing the casting shadows. That such drawbacks to the use of glass block skylights are serious is well evidenced by the fact that such skylights are not used to any appreciable extent in present day building construction.

It is accordingly the principal object of this invention to construct a glass block skylight embodying a fabricated metallic frame divided into longitudinally or transversely extending units or sections each seating a row of glass blocks from one end of the frame to the other, and which frame is so designed as to be readily attached in place in a building structure and in which the glass blocks may be readily placed and removed when necessary.

Another object of this invention relates to a sealing joint construction for the glass blocks such that the joint between the opposed faces of adjacent rows of glass blocks and that between opposed faces of adjacent glass blocks in each row as well as the joint betwen the outermost glass blocks and the wall of the skylight frame will permit the deflection, expansion and contraction of the metallic frame without setting up any stresses in the glass blocks to cause fracture or cracking thereof, and which sealing joint construction will always remain watertight regardless of load or weather conditions reacting on said frame and glass blocks; that provided between adjacent rows of glass blocks utilizing either packing and metallic clamping elements or a composite non-metallic construction, while that used between adjacent glass blocks in the same row comprising a composite non-metallic packing construction.

A still further object of this invention relates to the provision of different types of specially formed glass blocks such as to permit the use of a composite sealing joint between opposed faces of said blocks of adjacent rows similar to that used between adjacent glass blocks in the same row.

Other objects of this invention relate to a canopy guard for use with the compound non-metallic packing joint to prevent separation of the same from the surfaces of the glass blocks and to protect the same from the direct rays of the sun and other atmospheric conditions; and to a water drainage system embodied in the skylight frame supporting one type of the specially formed glass blocks to take care of any water that in some manner might leak through the sealing joints between adjacent rows of said specially formed glass blocks.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Practical embodiments of the invention are illustrated in the accompanying drawings, wherein:

Fig. 1 is a plan view of the skylight with a portion of adjacent glass blocks at one end thereof broken away to show details of construction.

Fig. 2 is a longitudinal sectional view of the skylight taken on line 2—2, Fig. 1.

Fig. 3 is a transverse sectional view of the skylight frame taken on line 3—3, of Fig. 1, the glass blocks being shown in dotted lines.

Fig. 4 is a detail sectional view taken on line 4—4, Fig. 1, showing details of the longitudinal sealing joint construction.

Fig. 5 is a detail sectional view taken on line 5—5, Fig. 1, showing details of both longitudinal and transverse sealing joint construction.

Fig. 6 is a detail sectional view taken either on line 6—6, Fig. 1, or line 6—6, Fig. 5, showing further details of the transverse sealing joint construction.

Fig. 7 is a detail sectional view of a transverse sealing joint construction showing application of a canopy guard thereto.

Fig. 8 is a longitudinal sectional view of the canopy guard taken on line 8—8, Fig. 9, showing prong formation.

Fig. 9 is a cross-sectional view of the canopy guard prior to insertion into the transverse sealing joint.

Fig. 10 is a detail sectional view showing a modified form of longitudinal sealing joint construction.

Fig. 11 is a bottom plan view of a modified form of glass block.

Fig. 12 is a cross-sectional view similar to that of Fig. 4, showing a longitudinal sealing joint construction for glass blocks of the type shown in Fig. 11.

Fig. 13 is a detail sectional view of a modified form of skylight frame construction for glass blocks of the type shown in Figs. 11 and 12, showing a gutter drain connection for water leakage.

Fig. 14 is a sectional view similar to that of Figs. 4 and 12 showing a still further modified form of glass block.

Fig. 15 is a partial sectional view similar to that of Fig. 10, showing a still further modified form of glass block and longitudinal sealing joint construction.

Similar numerals of reference indicate corresponding parts.

Referring to the drawings:

The supporting frame of the skylight indicated generally by the numeral 10 constitutes one typical embodiment of such a frame which in practice will give reliable and satisfactory results, and comprises a rectangular frame made up of longitudinal side flat plate members 11 and transverse angle bar members 12, the flat side plate members 11 being arranged on edge with the end portions thereof abutting the terminal ends of the angle bars 12 which latter are positioned to face outwardly, and rigidly secured thereto as by welding or any other suitable means, in such manner that the flanges 13 of the angle bars 12 and the bottom edges 14 of the flat side plates 11 will lie in substantially the same plane. Preferably the width of the flat side plates 11 and the vertical flanges 15 of the angle bars 12 are of the same height. The supporting frame 10 is shaped to fit the skylight opening formed in the roof of the building, such opening being defined by opposed pairs of channels 16 and 17, the opposed channels 16 extending transversely and being secured to the roof joists 18 as by brackets 19, while the channels 17 extend longitudinally between the channels 16 being secured to adjacent roof joists in any desired manner (not shown). The channels 16 and 17 are so disposed that their bases form a flat walled rectangular opening with the upper channel flanges 16ª and 17ª lying in the same plane with the top surfaces of the joists so as to partake of the same roof pitch. If desired the channels 16 and 17 may be rigidly secured together as by welding to provide a unitary rigid structure.

The skylight frame 10 is adapted to be seated on the upper channel flanges 16ª and 17ª, both the frame 10 and supporting channels 16—17 being so dimensioned that the longitudinal distance between the vertical flanges 15 of the angle bars 12 will be slightly greater than the distance between the opposed transverse channels 16 so that when the frame 10 is placed in position there will be provided inwardly of each vertical flange 15 a shelf or ledge 20, see Figs. 1 and 2, while the transverse distance between the flat side plates 11 equals that between the channels 17 so that the flat sides plates 11 will seat on the upper inner edge 21 of the channels 17 to lie flush with the bases thereof, see Fig. 3. The frame 10 is rigidly secured to the channels by rivets or bolts 22 securing the angle bars 12 to the channels 16, and by angle brackets 23 rigidly carried exteriorly by the flat side plates 11 and attached by rivets or bolts 24 to the channels 17.

Arranged within the frame 10 and extending longitudinally thereof are a plurality of parallel T-rails 25 placed in inverted position with their legs 26 uppermost and their flanges 27 lying in the same plane with the horizontal flanges 13 of the angle bars 12, the ends of said T-rails abutting the inner faces of the vertical flanges 15 and being rigidly secured thereto as by welding. The T-rails 25 are equally spaced a predetermined distance from the flat side plates 11 and from each other so as to receive therebetween the rows of glass blocks 28 with a clearance between each longitudinal side face 29 of a glass block and the opposed surface of the leg 26 of the T-rail 25 as clearly shown in Fig. 3.

It will be noted that in the placement of the skylight frame 10 on the channel support frame, the terminal end portions of the T-rails 25 will directly seat on the ledges 20, (see Fig. 1), provided therefor on the channels 16 so as to provide an additional support for said T-rails in the sustaining of the load created by the glass blocks carried thereby.

The glass blocks 28 seated between the T-rails are identical with the conventional form of glass building block used in building wall construction, and are arranged in rows with adjacent glass blocks in spaced juxtaposed relation.

In assembling the glass blocks within the skylight supporting frame 10 there is first placed on each of the flanges 27 of each T-rail 25 a yieldable sealing strip 30 of cork or other suitable material which extends lengthwise of each of said T-rails from end to end. Positioned on each T-rail are a plurality of like inverted rigid sheet metal yokes 32, the arms 33 of which straddle the legs 26 of the T-rails, the ends of said arms being bent outwardly as at 34 to be inserted beneath the sealing strips 30 as clearly shown in Fig. 4. Carried by the bight portion of each yoke is an upwardly extending bolt 35 which projects through an opening therein and is of a length such as to project a substantial distance above the upper surface of the glass blocks 28. The head 36 of the bolt 35 is elongated (see Fig. 5) and is disposed between the arms 33, said bolt being prevented from dropping downwardly by the inwardly bent lugs 37, in the manner readily apparent. Obviously other means may be utilized for securing the bolt 35 to the yoke 32, as for example by welding. The number of yokes 32 carried by each T-rail is equal to the number of glass blocks comprising a row of the same, each yoke being centrally arranged between a pair of transversely opposed glass blocks for a purpose to be hereinafter described. The rigidity of the yokes 32 is such that the same will serve as spacer elements to space the opposed rows of glass blocks as well as a holding means for the sealing strips 30.

As the glass blocks 28 are placed in position on the sealing strips 30 there is placed between the opposed transverse sides 29ª thereof a sealing insert 40 of cork or other suitable material which is of a height less than the depth of said glass blocks and of a length not less than the width of said glass blocks, see Figs. 5 and 6. Similar sealing inserts 40ª and 40ᵇ are positioned between the sides of the outermost glass blocks and the inside surface of the side walls of said supporting frame 10. The sealing inserts 40, 40ª and 40ᵇ are of such a thickness as to be placed under lateral compression when the glass blocks 28 are all assembled within the frame. In view of the compression placed on said sealing inserts as well as the fact that the surfaces of the glass blocks are roughened said inserts will positively and immovably engage the same in a friction and water tight engagement. This also holds true of the engagement of the sealing inserts 40ª and 40ᵇ with the metallic side walls of the supporting frame 10.

To seal the space between opposed rows of glass blocks there is provided a strip 42 of a yieldable water and weather resisting material such as slater's felt, rubber composition or any other suitable material, which strip is placed on the top surface of the glass blocks bridging said space and which extends the full length thereof, said strip being of such a width as to overlap the top edge portions of said glass blocks for a substantial distance, see Figs. 4 and 5. Longitudinally spaced openings 43 are formed in the strip through which the bolts 35 are adapted to project. Superposed on the sealing strip 42 is a sheet metal clamping bar 45 of convex curvature provided with a pair of inwardly directed flanges 46 adapted to engage the edge portions of the strip 42 overlapping the top surface of the glass blocks 28, as clearly shown in Fig. 4. Openings 47 are provided in the clamping bar 45 spaced at predetermined distances through which the bolts 35 are adapted to project. Surrounding each bolt is a sealing washer 48 shaped to fit the convex surface of the clamping bar 45, the end of the bolt being threadedly engaged by a blind nut 49. Thus, by setting up on the nuts 49 the upper sealing strip 42 is compressed into clamping engagement with the upper surface of the glass blocks to insure a water tight connection. The terminal ends of the clamping bar 45 are closed in any desired manner to prevent the entry of water thereinto.

It will be noted that the longitudinal sealing joint connections are wholly independent of the T-rails 25. Inasmuch as the rows of glass blocks are immovable with reference to the supporting frame 10, the clamping pressure set up by the clamping bar 45 on the sealing strip 42 is never disturbed. For the same reason the sealing inserts 40 are always retained under compression. Thus there is no positive direct connection between the glass blocks and the supporting frame 10, the sealing joints being fixed directly to the glass blocks themselves. By virtue of this construction, expansion or contraction as well as deflection of the skylight structure will not act to set up stresses in the glass blocks such as to cause cracking thereof and separation of the sealing joints, as both the transverse and longitudinal sealing joints possess sufficient "give" to permit of relative movement between the metallic supporting frame and the glass blocks.

The space above the sealing inserts 40, 40ª and 40ᵇ is preferably filled with any suitable sealing compound 50 as for example a heat treated tar and sulphur compound, level with the top surface of the glass block.

It is well known that the direct rays of the sun on the surface of the sealing compound will act to cause the same to crack and break away from the glass blocks thus reducing the effectiveness of the sealing compound as a water tight seal. In order to obviate any such tendency for the sealing compound to so crack there may be utilized therewith a canopy guard 55 formed of relatively thin gauge sheet metal shaped to provide an arcuate canopy 56, an integral depending shank 57 terminating at its lower edge with laterally offset staggered V-shaped lugs 58 disposed normal to the plane of the shank 57. The distance between the ends of the lugs 58 exceeds the distance between the opposed faces 29ª of the glass blocks 28, see Fig. 7, so that when the canopy guard is inserted into the sealing compound (prior to the same hardening) the lugs 58 will be bent upwards with the points thereof engaging the normally roughened glass block surfaces 29ª to securely lock the canopy guard in position. The arcuate canopy 56 is formed with a flat bottom 59 which latter when the canopy guard is fully inserted into the sealing compound will seat on the top surface of the glass blocks 28 to completely cover the exposed surface of the sealing compound in the manner clearly shown, see Fig. 7. The length of the canopy guard 55 is such as to extend the full length of the sealing joint between the glass blocks.

In Fig. 10 there is shown a modified form of clamping bar construction for the sealing joint between opposed rows of glass blocks. In this form the clamping bar 65 is formed of sheet metal comprising a central channel portion 66, the upstanding flanges 67 of which are provided at their ends with laterally extending arms 68 each constituted by a folding over of the metal to provide a double thickness, the upper layer of said arms each extending towards each other and having their edge portions inclined upwardly and outwardly to form shoulders 69. Preferably the two layers constituting the arms 68 are rigidly secured together as by welding or riveting (not shown) so as to insure rigidity of the arms. Arranged between the clamping bar 65 and the glass blocks 28 is a sealing strip 70 of the same material as the sealing strip 42, see Fig. 4, deformed by the clamping bar into channel shape. The width of the channel portion 66 of the channel bar is less than the distance between the rows of glass blocks such that when the clamping bar is placed in position the channel portion 66 will act to place the portion of the sealing strip between the channel flanges 67 and adjacent opposed faces of the glass blocks under lateral compression, the clamping bar 65 being drawn down by the bolts 35 and nuts 71. At the same time the arms 68 will act to compress the end portions of the sealing strip seated on the upper surface of the glass blocks. As will be noted the bolts 35 (which are attached to the yokes 32, see Fig. 4), extend upwardly into the channel portion 66 through the base thereof, the nuts 71 being seated within said channel. In order to provide a closure for the channel portion of the clamping bar 65 so as to protect the nuts 71 and exposed portions of the bolts 35 as well as to prevent the accumulation of water, etc., within the channel portion, there is formed a sheet metal cover plate 72 provided with inwardly inclined flanges 73, the construction being such that by telescoping the cover plate 72 over the clamping bar 65 the flanges 73 will frictionally engage the inclined shoulders 69 to provide a tight connection. This clamping bar construction has the advantages of providing an increased area of pressure contact between the sealing strip and the glass blocks as well as presenting a smooth flat top for the sealing joint thus providing a neater appearance than that shown in Fig. 1 wherein the bolts and nuts are exposed.

In the form of skylight construction shown in Figs. 1 to 10, conventional glass blocks have been used and supported by standard T-rails, including the use of longitudinal sealing joints such as shown in Figs. 4, 5 and 10. However, this type of sealing joint may be replaced by one embodying the constructional features of that used between adjacent glass blocks in each row. Thus, in Figs. 11 and 12 there is shown a modified construction wherein the glass blocks 75 are specially formed so as to provide on their base 76 marginal depending extensions 77 arranged one at each side and running the full length thereof, as clearly shown in Fig. 11. The extensions 77 are of a substantial depth and are formed on their inner faces with a concave seating surface 78, the outer faces of said extensions lying flush with the longitudinal sides of said glass block.

The T-rail 80 utilized for supporting the glass blocks 75, comprises a leg portion 81 and lateral flange portions 82, each provided at their ends with an upstanding marginal seat 83 on the same side as the leg portion 81 and having a convexly curved inner surface 84 complemental to the concave surface 78 of the glass block extensions. Prior to placing the glass blocks 75 in position on the T-rails 80 (which are utilized with a supporting frame such as 10) there is first placed on the curved seats 83, and on each side of the leg portion 81, yieldable water resistant sealing inserts 85 and 86, respectively, of cork, rubber composition or any other suitable material. Preferably the sealing insert or strip 85 is of a width as to completely cover the curved seat surface 84 and extends the full length of the T-rail. The sealing inserts 86 are preferably of a width as to equal the width of the leg portion 81 and to extend the full length of the T-rail. Both the sealing strips 85 and sealing inserts 86 are of such a thickness that the glass blocks 75 must be pressed into place whereby to compress said sealing strips and inserts to thus provide a water tight seal. By virtue of the use of the sealing strips 85 there is formed between the base of the marginal extensions 77 and the flanges 82 of the T-rail, a channel or conduit 88 for a purpose to be hereinafter described.

The remaining portion of the space above the T-rail leg portion 81 is filled with a sealing compound 89 similar to the sealing compound 50. The glass blocks 75 are assembled in spaced end to end relation in the same manner as the glass blocks 28, the sealing joint between adjacent glass blocks 75 being identical with that as described herein above as to the use of a sealing insert 40 and sealing compound 50, see Figs. 5 and 6. If desired there may be utilized with the longitudinal sealing joint a canopy guard 90, similar to that used in the transverse sealing joints, see Figs. 7, 8 and 9.

The mounting and sealing of the glass blocks 75 on the T-rails 80 in a skylight structure of this character besides possessing all the advantages described hereinabove with reference to the glass blocks 28 in the form of skylight structure Fig. 1, has the further advantage of requiring fewer parts by dispensing with the use of the yokes, bolts and clamping bars, and of being cheaper and easier to manufacture, assemble and repair. Both the T-rail 80 and glass block 75 present no problem in their structural design and hence are easily manufactured.

If for any reason water should leak through the composite sealing joint 86—89, the same will collect in the conduit or channels 88 to be discharged through openings 91 provided at the lower end of the T-rails 80 into a gutter 92 and discharge pipe 93, see Fig. 13. The water collecting in a channel 88 cannot creep upwardly between the contacting surfaces of the sealing strip 85 with the glass block seat 78 and T-rail seat 84, because of the great pressure on said strip 85 arising as a result of the weight of the glass block and the fact that the same is pressed into its seating position, it being obvious that the pressure of the collected water is much less. It is to be understood that the showing in Fig. 13 is wholly illustrative of a means for discharging leakage water collected in the channels 88 and is not indicative of a preferred practical embodiment.

In Fig. 14 there is illustrated a modified form of special glass block construction supported on a conventional T-rail such as 25. In this constructional form the glass block 95 is provided on its upper surface with an upstanding extension 96 at each longitudinal side thereof extending the full length of the glass block, each extension 96 comprising a flat top 97, an outer side wall 98 flush with the longitudinal side of the glass block and an inner side wall inclined downwardly and outwardly. Placed on the T-rail flanges 27 are sealing strips 30, and seated on the end of the T-rail leg 26 is a sealing insert 100 of the same material as the strip 30 and of such a width, that when the glass blocks 95 are placed in position the insert 100 will be laterally compressed to provide a water tight seal between the rows of glass blocks, the glass blocks seating on the sealing strips 30. Both the sealing strips 30 and sealing inserts 100 extend the full length of the T-rail 25 supporting adjacent rows of glass blocks 95. The space between the rows of adjacent glass blocks 95 above the sealing insert 100 is filled with a sealing compound 101 similar to the sealing compound 50. The spaces between adjacent glass blocks 95 in each row is sealed by a composite sealing joint comprising insert 40 and sealing compound 50 as shown in Figs. 5 and 6.

To protect the longitudinal sealing joint 100—101, there is seated on the flat tops 97 of the extensions 96 a sealing strip 102 of slater's felt or any other suitable material. A sheet metal cover 103 provided with a central longitudinally extending corrugation 104 and inwardly inclined end flanges 105 is telescoped over the marginal extensions 96 so that the flanges 105 will frictionally engage the inclined side walls 99 thereof, and at the same time said cover will act to tightly press the sealing strip 102 against its seats so as to provide a positive water tight connection. The cover 103 by virtue of its corrugation 104 will permit relative contraction and expansion movement between the T-rail and glass blocks and will further protect the sealing compound from the rays of the sun and the action of the elements.

In Fig. 15 there is shown a still further modified form of glass block construction and sealing joint, wherein the glass block 110 is provided at the top surface thereof with a depressed shoulder 111 arranged parallel to the top surface of the block and extending the full length thereof, there being one such shoulder at each side of the block. This, with the blocks 110 arranged in rows in spaced relation, the shoulders 111 will define a depressed channel in conjunction with the space between said rows. The space between opposed rows of blocks 110 is sealed by a joint construction similar to that shown in Fig. 10. Seated on the shoulders 111 is a sealing strip 112 of the same material as the sealing strip 30 or 70, the intermediate portion of which is depressed into contact with the opposed sides 113 of the blocks 110 by the channel shaped metallic clamping bar 114 which is provided with laterally extending flanges 115 clampingly engaging the portions of the sealing strip seated on the shoulders 111. The clamping bar 114 is clamped into position by means of bolts 35 which project upwards into the channel bar, in the same manner as shown in Fig. 10, the nut 116 threaded on the bolt 35 being seated in said channel bar. The bolt 35 is attached to a yoke member such as 32, see Fig. 4, and terminates below the plane of the top surface of the blocks 110.

Each of the longitudinal ends of the clamping bar flanges 115 is bent upwardly with the upper edge thereof bent outwardly to provide a holding edge 117 which is laterally spaced from the vertical wall 118 of the recessed shoulder. A metallic flat closure plate 119 is formed with a longitudinal depending flange 120 at each end thereof, the edge of which is bent inwardly to define a holding edge 121, the distance between said flanges 120 being equal to the distance between the vertical walls 118. Thus with the clamping bar 114 clamped into position, the joint is covered by the closure plate 119 being pressed inwardly into the channel space between the glass blocks into "snap-on" engagement with the clamping bar 114. The holding edges 121 of the former interlocking with the holding edges 117 of the latter in the manner readily apparent. If desired a sealing compound 122 may be used to fill in the space above the clamping bar 114 to provide an additional seal, the closure plate being then pressed into place before the sealing compound hardens.

As will be seen this sealing joint construction in conjunction with the recessed shoulder blocks provides a flat surface flush with the top surface of the blocks 110, the sealing joint being protected from injury by the metal closure plate 119. This construction is highly desirable as it provides a light transmitting structure which is level throughout its entire extent. Thus being especially suitable for use not only in skylights, but also for use in vault lights or floor lights. Obviously longitudinal sealing joints such as shown in Figs. 12 and 14 may be used with the blocks 110.

It is to be understood that the longitudinal composite sealing joint construction 86—89 of Fig. 12, and 100—101 of Fig. 14 may be utilized with the standard form of glass building block 28, Figs. 1–6.

A glass block skylight constructed in the manner as described above will transmit a maximum of light without the casting of any shadows, is leak proof, and will not cause condensation to be formed on the inside surface of the glass blocks. Variations in the amount of light transmitted may be achieved by coating the surface of the glass blocks with certain well known preparations designed for this purpose or by using glass blocks so designed as to permit only a certain amount of light transmission.

The principles of this invention as to assembling glass building blocks in rows on a fabricated metal supporting frame and the manner providing sealing joints between the glass blocks and between the glass blocks and the side walls of the supporting frame are applicable to any form of skylight construction whether of a flat, inclined, arch or dome shape. This invention is further applicable to either a vault light or floor light construction.

I claim:

1. A light transmitting structure comprising a plurality of rows of glass blocks with the blocks in each row arranged in spaced end to end relation and each row being laterally spaced with relation to an adjacent row, means supporting said rows of blocks, and separate and distinct sealing means, one kind sealing the spaces between the rows of blocks and the other kind sealing the spaces between the blocks in each row, both said means being wholly carried by said blocks free of any direct positive engagement with said supporting means.

2. A light transmitting structure comprising a supporting frame, a plurality of rows of glass blocks arranged within said frame with the blocks in each row disposed in spaced end to end relation and each row being laterally spaced with relation to an adjacent row, means on said frame extending in the same direction as said rows constituting the sole support for said rows of blocks, means sealing the spaces between the rows of blocks and individual means independent of said first mentioned means sealing the spaces between the blocks in each row, both said means being wholly carried by said blocks free of any direct positive engagement with said supporting means, and means sealing the blocks adjacent said frame to said frame.

3. A light transmitting structure comprising a frame and a plurality of bar members each provided with a pair of seating flanges, a plurality of rows of glass blocks, the blocks comprising each row seated at their corresponding base edge portions on opposed seating flanges of adjacent bar members, said blocks in each row being arranged in spaced end to end relation with the blocks in one row seated in uniformly spaced relation to the blocks of an adjacent row, said bar members constituting the sole support for said rows of blocks, sealing means for the space between adjacent rows of blocks and a sealing joint for the space between adjacent blocks in the same row, said sealing means and sealing joints being separate and distinct and wholly supported by said blocks and independent of any direct connection to said bar members.

4. In the light transmitting structure as set forth in claim 3, said sealing means including a sealing strip engaging the adjacent top edge portions of the blocks in adjacent rows, and means independent of direct engagement with said bar member for compressing said sealing strip.

5. In the light transmitting structure as set forth in claim 3, said sealing means comprising a lower sealing strip between the base edge portion of each row of blocks and its adjacent seating flange, an upper sealing strip engaging the opposite top edge portion of the blocks in each said row, a clamping bar seated on said upper sealing strip, and means engaging the lower sealing strips and co-acting with said clamping bar for placing said sealing strips under compression.

6. In the light transmitting structure as set forth in claim 3, said sealing means comprising a lower sealing strip between the base edge portion of each row of blocks and its adjacent seating flange, an upper sealing strip engaging the opposite top edge portion of the block in each said row, and clamping means engaging both said upper and lower sealing strips for compressing the same.

7. In the light transmitting structure as set forth in claim 3, each said sealing joint comprising a sealing insert under an initial lateral compression and a sealing compound superposed above said insert, both said sealing insert and sealing compound completely filling the space between adjacent blocks in each row.

8. In the light transmitting structure as set forth in claim 3, each said sealing joint comprising a sealing insert of a length not less than the width of said blocks and of a width less than the depth of said blocks and so positioned that the lower edge of said insert will lie substantially in the plane of the base of said blocks such as to fill a substantial portion of the space between adjacent blocks in the same row, each said sealing insert being under an initial lateral compression, and a sealing compound filling the remainder of said space between adjacent blocks.

9. In the light transmitting structure as set forth in claim 3, said sealing means comprising a lower sealing strip between the base edge portion of each row of blocks and its adjacent seating flange, a sealing insert under an initial lateral compression in the space between adjacent rows of blocks and in contacting engagement with an intermediate portion of the opposed surfaces of said blocks, and a sealing compound filling the space between said rows above said sealing insert.

10. In the light transmitting structure as set forth in claim 3, said sealing means comprising a lower sealing strip between the base edge portion of each row of blocks and its adjacent seating flange, a sealing insert under an initial lateral compression in the space between adjacent rows of blocks and in contacting engagement with an intermediate portion of the opposed surfaces of said blocks, and a sealing compound filling the space between said rows above said sealing insert, and said sealing joint including a similar sealing insert under an initial lateral compression in contacting engagement with a lower portion of the opposed surfaces of adjacent blocks in the same row and a sealing compound filling the space thereabove.

11. In the light transmitting structure as set forth in claim 3, said sealing means comprising a lower sealing strip between the base edge portion of each row of blocks and its adjacent seating flange, said base edge portions of said blocks and said seating flanges being so constructed and arranged as to provide a channel therebetween extending the full length of said bar members, a sealing insert under an initial lateral compression in the space between adjacent rows of blocks and in contacting engagement with an intermediate portion of the opposed surfaces of said blocks, and a sealing compound filling the space between said rows above said sealing insert.

12. In the light transmitting structure as set forth in claim 3, said sealing means comprising a lower sealing strip between the base edge portion of each row of blocks and its adjacent seating flange, a sealing insert under lateral compression in the space between adjacent rows of blocks and in contacting engagement with an intermediate portion of the opposed surfaces of said blocks, and a sealing compound filling the space between said rows above said sealing insert, said blocks being each formed with an upstanding marginal extension at the top thereof in the same plane as said base edge portions, and a metallic cover means attached to the marginal extensions of adjacent rows of blocks to protect the sealing means in the space therebetween.

13. In the light transmitting structure as set forth in claim 3, said sealing means comprising a lower sealing strip between the base edge portion of each row of blocks and its adjacent seating flange, a sealing insert under lateral compression in the space between adjacent rows of blocks and in contacting engagement with an intermediate portion of the opposed surfaces of said blocks, and a sealing compound filling the space between said rows above said sealing insert, including a metallic guard for the exposed end of said sealing compound seated on the top surface of said blocks and being provided with a depending securing member adapted to be embedded within the sealing compound.

14. In the light transmitting structure as set forth in claim 3, said sealing means comprising a lower sealing strip between the base edge portion of each row of blocks and its adjacent seating flange, a sealing insert under lateral compression in the space between adjacent rows of blocks and in contacting engagement with an intermediate portion of the opposed surfaces of said blocks, and a sealing compound filling the space between said rows above said sealing insert, and said sealing joint including a similar sealing insert under lateral compression in contacting engagement with a lower portion of the opposed surfaces of adjacent blocks in the same row and a sealing compound filling the space thereabove, both said sealing means and sealing joints each respectively including a metallic guard for the exposed end of the sealing compound thereof, said metallic guard being provided with a depending securing member adapted to be embedded within the sealing compound.

15. A light transmitting structure comprising a frame and a plurality of bar members each provided with a pair of seating flanges, a plurality of rows of glass blocks, the blocks comprising each row seated at their corresponding base edge portions on opposed seating flanges of adjacent bar members, said blocks in each row being arranged in spaced end to end relation with the blocks in one row seated in uniformly spaced relation to the blocks of an adjacent row, a continuous sealing means extending the full length of each row for each space between adjacent rows of blocks, and an individual sealing joint for each space between adjacent blocks in the same row, said sealing means and sealing joints being separate and distinct and wholly supported by said blocks and free of any direct positive connection to said bar members.

16. For use in a light transmitting structure, a glass block comprising longitudinal side walls, transverse end walls, and top and bottom walls, a depending marginal extension formed integral with said bottom wall and extending longitudinally thereof adjacent each of the side walls thereof and terminating in the plane of said transverse end walls to define with said bottom wall an open ended inverted channel, said marginal extensions being adapted for interlocking seating engagement with a supporting member.

17. For use in a light transmitting structure, a glass block comprising longitudinal side walls, transverse end walls, and top and bottom walls, an upstanding marginal extension formed integral with the top wall adjacent one of the longitudinal side walls and extending the full length of said block, said extension being so formed as to include an inner side wall surface so shaped as to be adapted to coact with a like side wall surface on the extension of a similarly shaped glass block to be paired therewith for telescoping interlocking engagement with a metallic cover element.

18. A glass block light transmitting structure comprising a frame, laterally spaced supporting members each extending in the same direction between opposed sides of said frame and connected only at their ends thereto, adjacent supporting members seating a row of glass blocks with each supporting member formed to only support the opposed sides of the blocks opposite each other in adjacent rows, each said block being unsupported at the sides thereof bridging the space between adjacent supporting members.

19. In a light transmitting structure comprising a frame, an inverted T-rail supported at its ends on said frame providing laterally related seating flanges, a row of glass blocks seated along one side portion thereof on one of said seating flanges and arranged in end to end relation, a similar row of glass blocks similarly seated on the other of said seating flanges, said rows of blocks being laterally spaced from each other and from the upstanding leg of said T-rail, a sealing strip positioned between each seating flange and its supported row of blocks, a yoke member in said space straddling the leg portion of the T-rail comprising at the end of each of the arms thereof a lateral extension adapted to be inserted between said sealing strips and the seating flanges, there being at least one such yoke member for each pair of laterally opposed blocks, a sealing strip positioned on the top surface of said blocks and bridging said space, a clamping bar superposed on said latter sealing strip, and bolt means interconnecting each of said yokes with said clamping bar for compressing said last mentioned sealing strip whereby to provide a water tight seal.

20. A canopy guard for use with a sealing joint between adjacent glass blocks formed of relatively thin sheet metal and comprising an upper canopy portion adapted to seat on the top surface portions of said blocks adjacent the sealing joint therebetween so as to provide a cover for the exposed surface of the sealing joint, a depending vertical leg portion integral with said canopy portion, laterally extended lug members provided along each side of the lower edge of said leg portion and normal to the plane thereof, the combined length of said lug members exceeding the width of the sealing joint, said leg portion being adapted to be forced into the sealing joint so as to be wholly embedded therein, whereby said lug members will be bent upwardly to engage the opposed side surfaces of said blocks whereby to secure said canopy guard in position.

21. For use in a light transmitting structure, a glass block comprising longitudinal side walls, transverse end walls, and top and bottom walls, each longitudinal side wall being formed adjacent the top wall with a like recessed shoulder extending the full length of said block, each recessed shoulder comprising a horizontal shoulder portion and a vertical wall portion, said horizontal shoulder portions lying in the same plane parallel to said top wall.

22. In the light transmitting structure as set forth in claim 3, said glass blocks being each provided along their top longitudinal edges with a recess including a flat horizontal shoulder and a vertical wall portion whereby the opposed blocks in adjacent rows will define a longitudinal channel below the top surface of said blocks, said sealing means engaging said shoulders to seal the space between said rows of blocks and including upstanding holding means and a flat metallic closure plate provided with depending holding means, said closure plate being of a width such as to fit between the opposed vertical wall portions of said channel in a press fit engagement with the holding means thereof interlocking with said upstanding holding means whereby said closure plate will lie flush with the top surface of said blocks.

JACK O. CHERTKOF.